Aug. 25, 1936.   E. G. ZELLERS   2,052,376
INSOLUBLE PILL OR TABLET FOR INTERNAL MEDICINAL USES
Filed May 18, 1933
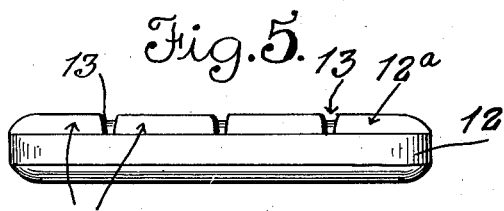
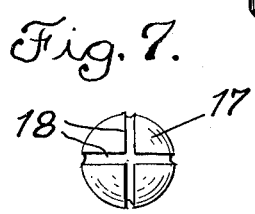
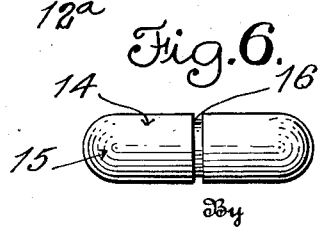
Inventor
E. G. Zellers
By Bryant & Lowry
Attorneys.

Patented Aug. 25, 1936

2,052,376

UNITED STATES PATENT OFFICE 2,052,376

INSOLUBLE PILL OR TABLET FOR INTERNAL MEDICINAL USES

Edgar G. Zellers, Reading, Pa.

Application May 18, 1933, Serial No. 671,745

2 Claims. (Cl. 167—53)

This invention relates to an insoluble pill or tablet for internal medicinal uses.

The insoluble pill or tablet is in the nature of a medicine to be administered to poultry especially chickens and turkeys for destroying intestinal worms and as this medicine is of a poisonous character, it is essential that the pill or tablet pass undisturbed through the throat, crop and glandular stomach of the fowl for entry into the gizzard where the medicinal properties of the pill or tablet are released for the destruction of worms in the gizzard and lower intestinal tract beyond the gizzard because the release of the medicine from the pill or tablet in the digestive tracts of the fowl would be poisonous to the fowl and probably cause death.

Numerous attempts have been made in producing a worm medicine for the treatment of poultry, such as the encasing of a worm eradicating poisonous substance in the nature of a liquid or powder in a hardened casing or shell and it has been found that in the feeding of worm medicine of a poisonous character of this kind to poultry, the hardened shell frequently becomes broken during passage through the digestive tracts and if lodged in such tract, the hardened shell or casing dissolves and liberates the poisonous worm medicine, or said hardened shell will be dissolved by the digestive juices in the tract resulting in more serious maladies to the poultry and frequently death thereof. The hardened shell is of an extremely friable character and is liable to disintegration in handling as well as in passage through the digestive tracts.

It is therefore the primary object of this invention to provide an insoluble pill or tablet containing poisonous medicines for destroying intestinal worms in poultry wherein the pill or tablet is solid, the poisonous ingredients thereof having a shellac or other binder as a vehicle inter-mixed with the medicinal ingredients to produce a hard solid pill or tablet easily passable through the digestive tract of poultry for reception in the gizzard and there broken up by the natural action of the gizzard for liberation of the medicinal ingredients for destruction of worms in the gizzard and lower intestines.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a double tablet constructed in accordance with the present invention showing a weakened portion extending transversely and medially thereof to facilitate breakage for a half dosage;

Figure 2 is a side elevational view of the tablet shown in Figure 1;

Figure 3 is a top plan view showing the tablet of Figure 1 broken in half;

Figure 4 is a longitudinal sectional view taken on line 4—4 of Figure 1, showing the solid formation of the tablet;

Figure 5 is a side elevational view of a strip tablet having a series of transversely extending weakened lines;

Figure 6 is a side elevational view of a cylindrical form of tablet having a central weakened break line to facilitate manual breakage; and Figure 7 is a side elevational view of the article in spherical pill form having crossed circumferential weakened lines for facilitating friability of the pill by gizzard action of the fowl.

The medicinal tablet as shown in Figures 1 to 4 and designated by the reference character 10 is of a solid character and is comprised of medical ingredients for the destruction of poultry worms and this tablet which is of a dry or powder character is maintained in hard and solid tablet form by means of a suitable binder such as shellac that renders the tablet insoluble in the digestive juices of poultry so that the tablet will pass through the digestive tracts of poultry without liberating the medicinal properties thereof and be received in solid form in the gizzard of the poultry. The tablet 10 as shown in Figures 1 and 2 is transversely weakened medially thereof as at 11 so that the quantity or dose of medicine to be given to the poultry may be controlled by manually breaking the tablet 10 into two equal parts as shown at 10a in Figure 3. The tablet 10 is readily disintegrated, being of a friable character by the muscle action of the gizzard and also by contact with the grit or gravel in the gizzard, this disintegration being increased by the presence of acids or alkalies in the gizzard for the liberation of the medical ingredients into the gizzard and lower intestinal tracts resulting in the direct application of medicine to the particular intestinal elements of poultry usually infected with worms for destroying the worms. The tablet 10 is hard and solid, the medicinal ingredients being retained in solid tablet form by the shellac or other vehicle and this tablet is insoluble during passage through the digestive tracts of the fowl and is only disintegrated by mechanical and chemical action of the gizzard thereon.

The tablet 12 shown in Figure 5 is in stripped form for convenience in handling and this stripped tablet 12 is divided into sections 12a by means of transverse weakened portions 13 with each section 12a representing a single treatment or dose.

The tablet 14 shown in Figure 6 is of cylindrical form having rounded ends 15 and an annular weakened break line 16 similar to the break line 11 in Figure 1 for separating the cylindrical tablet 14 into two equal parts by manually breaking the same.

A spherical pill 17 is shown in Figure 7 and is of a size representing a single dose or treatment and this pill 17 has crossed circumferentially extending peripheral grooves 18 that facilitate disintegration of the pill 17 when entering the gizzard by grit and gravel action on the grooved portions of the pill 17 for quicker dissemination of the medicines conveyed thereby.

The gist of this invention resides in the provision of a hard and solid pill or tablet of a medicinal character for the destruction of worms in poultry, the medicinal ingredients of the pill or tablet that are of a dry character being retained in pill or tablet form by a vehicle such as shellac and this pill or tablet is insoluble in the digestive juices of poultry and is delivered in solid form into the gizzard of the poultry for disintegration and solubility so that the application of the medicine is to the parts of the poultry directly infected by worms, and as the poisonous medicines are not liberated in the digestive tracts of poultry, this pill or tablet is safely delivered to the gizzard with no injurious effect on the poultry, being only beneficial for the destruction of poultry worms.

From the above detailed description of the invention, it is believed that the same will at once be understood and while there are herein shown and described the preferred embodiments of the invention, it is nevertheless to be understood that minor changes may be made therein without departing from the spirit and scope of the invention as claimed.

I claim:—

1. An insoluble pill or tablet for the treatment of poultry comprising a hard solid member formed of medicinal ingredients and a shellac binder therefor, said member being insoluble in the juice of digestive tracts and glandular stomachs of poultry, the shellac binder being proportional relative to the medicinal ingredients, and said member being of such hardness to insure passage thereof to the gizzard without dissolving and to necessitate disintegration by muscular action of the gizzard for liberation of the medicinal ingredients into the gizzard and lower intestines.

2. An insoluble pill or tablet for the treatment of poultry comprising a hard solid member formed of medicinal ingredients and a shellac binder therefor, said member being insoluble in the juice of digestive tracts and glandular stomachs of poultry, the shellac binder being proportional relative to the medicinal ingredients, and said member being of such hardness to insure passage thereof to the gizzard without dissolving and to necessitate disintegration by muscular action of the gizzard for liberation of the medicinal ingredients into the gizzard and lower intestines, and said member having surface grooves facilitating mechanical action of the gizzard thereon for quick disintegration thereof.

EDGAR G. ZELLERS.